April 24, 1956   C. P. GLEESON ET AL   2,742,769
COUPLING
Filed Feb. 16, 1953   3 Sheets-Sheet 1

INVENTORS
CHARLES F. PERVIER
CLAUDE P. GLEESON
BY

ATTORNEY

April 24, 1956

C. P. GLEESON ET AL 2,742,769

COUPLING

Filed Feb. 16, 1953

INVENTORS
CHARLES F. PERVIER
CLAUDE P. GLEESON
BY

ATTORNEY

April 24, 1956  C. P. GLEESON ET AL  2,742,769
COUPLING

Filed Feb. 16, 1953  3 Sheets-Sheet 3

INVENTORS
CHARLES F. PERVIER
BY  CLAUDE P. GLEESON

ATTORNEY

United States Patent Office 2,742,769
Patented Apr. 24, 1956

2,742,769

COUPLING

Claude P. Gleeson, Springfield, and Charles F. Pervier, Newtown Square, Pa., assignors to Baldwin-Lima-Hamilton Corporation, a corporation of Pennsylvania Application February 16, 1953, Serial No. 337,028

3 Claims. (Cl. 64—9)

This invention relates generally to power transmission means and more particularly to an improved shaft coupling that is especially adapted for connecting an engine to certain types of driven equipment although the invention may be used in other applications involving similar driving problems.

An engine, such as a diesel engine, when used to drive certain types of equipment presents two particular problems which are sometimes difficult to solve. The one is the engine cyclic irregularity which tends to produce rough running of connected units, and the other is torsional critical speeds introduced either by the engine or equipment driven thereby, or both, and which can cause early failure in any part of the power transmission system. If the basic engine and flywheel system is free from detrimental torsional critical speeds, then a suitable torsionally flexible member applied between the engine flywheel and the driven equipment can be used to minimize or suppress the transmission of the cyclic irregularity to the driven equipment and at the same time, if there are serious torsional critical speeds arising from the application of the driven unit to the engine flywheel system, the torsional flexible member can be used to shift or relocate such critical speeds so that they occur at an operating speed or speeds outside the normal operating range of the complete equipment. For instance, various spring type torsionally flexible couplings are sometimes satisfactory for this purpose. However, such couplings have certain disadvantages including limitations of the torsional stiffness factor of the spring assembly for a given design. Heretofore it has been attempted to overcome the deficiencies of these prior couplings by employing bonded rubber disk type couplings. Moreover, these latter couplings, with the rubber disk bonded between driving and driven plates, have been heretofore satisfactory for transmitting only a limited amount of power with limited torsional resilience. Such couplings were considered unsatisfactory where a torsional deflection of from generally 2 to 3 degrees windup for full mean load torque is required in connection with engine horsepowers in which applicant is particularly interested such as of the general magnitude of 1000 to 2000 H. P. The reasons for such couplings being unsatisfactory are sometimes thought to be known but frequently the reasons are just assumed and often are just plainly unknown. The problem has been further perplexing in view of the very successful use of the bonded rubber disk type coupling in its other ranges of applications.

The deficiencies of the bonded rubber disk type coupling when used for torsional deflections and for horsepowers of the magnitude in which we are interested may be explained by the theory that the full strength of the bonded rubber disk has not been available for the transmission of normal working torques and that there must have been other operating conditions, either intrinsic or extrinsic, for diminishing the working capacity of the bonded rubber. While such prior types of rubber disk couplings have been unsatisfactory yet a bonded rubber disk type coupling built in accordance with our principles, and using only the same kind of materials and workmanship heretofore used, can be successfully employed for large torsional deflection and horsepower. Couplings for smaller deflection and horsepower would undoubtedly be benefited by employing our principles.

In accordance with our theory, the deficiencies of the customary bonded rubber disk coupling are believed to be caused by reason of the rubber being subjected to all possible known and unknown operating conditions transmitted from one shaft to the other or vice versa and that certain of said conditions, among possible others, may be parallel and angular misalignments, and possibly end thrust, combined with the simultaneous transmission of normal driving loads and torsional deflections. In our improved coupling we propose to modify the action of this normal all-inclusive functioning of the bonded rubber disk by combining with the torsionally deflectable rubber disk a cooperatively interacting mechanism of a type which provides for offset and angular misalignments, or both, as well as end float to eliminate axial thrust, and which coupling in its interaction with the rubber disk is believed additionally to further modify the transmission of the complicated combination of indeterminate disturbing forces existing between the driving and driven members.

It is accordingly an object of our invention to provide an improved combination of elements in a torsionally resilient type coupling employing a bonded resilient disk which will have maximum strength available for the primary function of transmitting torque with torsional resilience while still allowing other adverse operating conditions to be present in the coupling without them creating a destructive effect in the resilient disk.

Other objects are to provide in our improved coupling; means whereby a wide range of high torsional flexibility can be readily and conveniently obtained by varying the thickness, shape, or composition of the rubber; means whereby the rubber element may be conveniently or expeditiously removed for repair or replacement without disturbing the driving or driven equipment; means whereby excessive coupling sag is effectively eliminated; and means whereby the mechanical coupling portion of our combination may be lubricated in a simple and effective manner without subjecting the rubber to the lubricant.

A still further object of our invention is to provide an improved coupling of the type described which is relatively simple in construction, operation and maintenance, and that has a high degree of ruggedness without impairing the desirable sensitive functions of its operating parts.

Other objects and advantages will be more apparent to those skilled in the art from the following description of the accompanying drawings in which.

Figure 1:
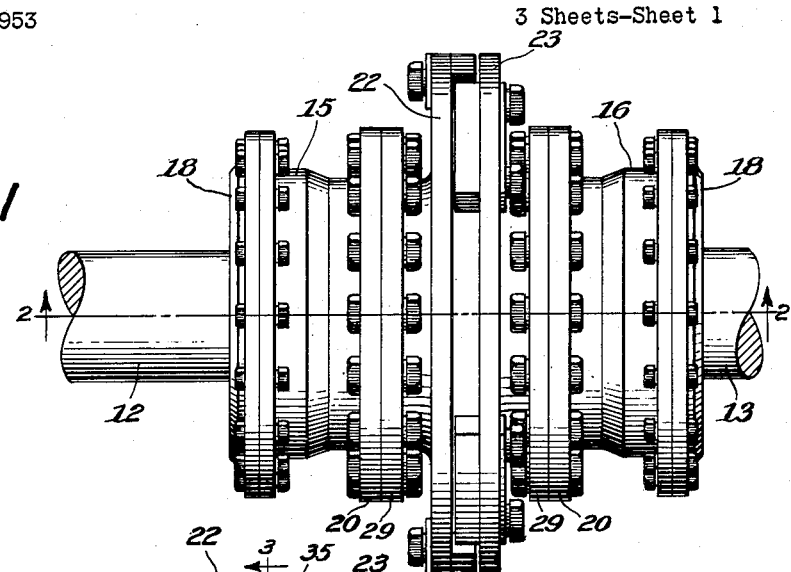
Fig. 1 is an elevational view of our novel torsionally flexible shaft coupling shown as joining together driving and driven shafts.
Figure 2:
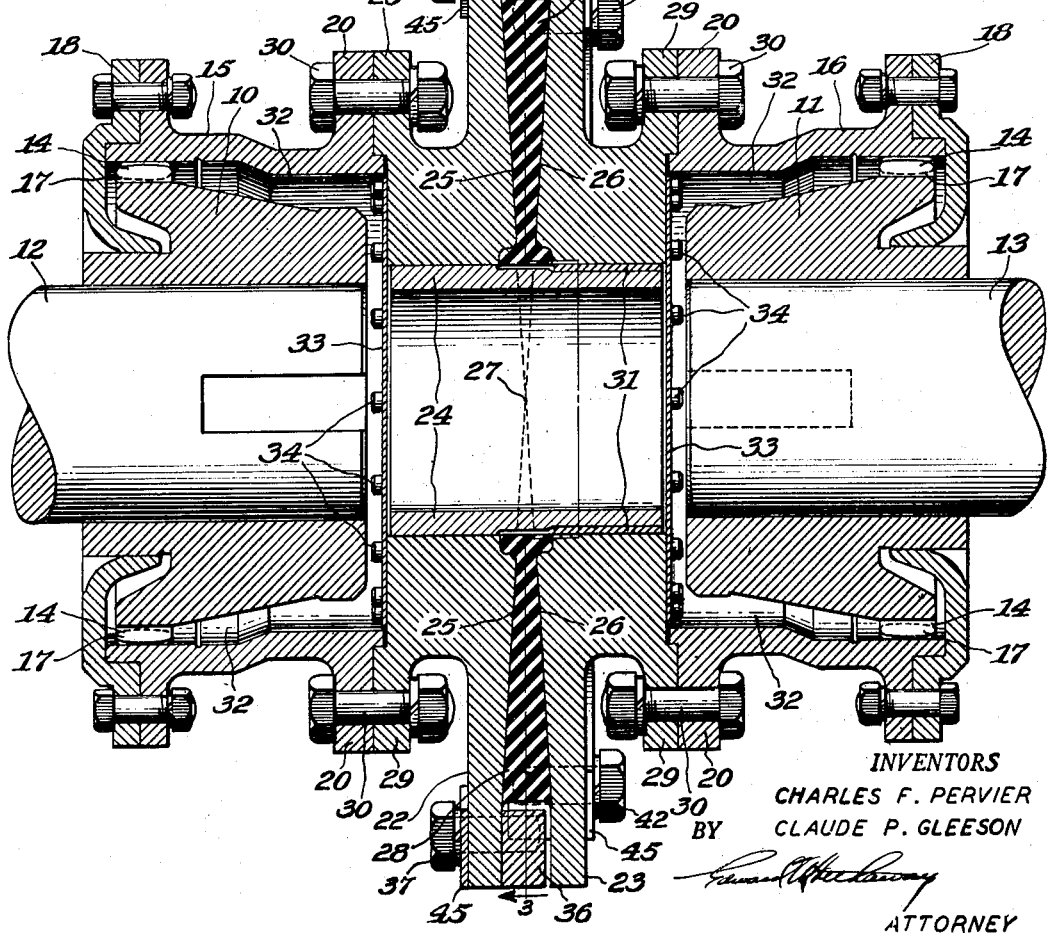
Fig. 2 is a longitudinal sectional view of our device taken through the axis of said shafts on the line 2—2 of Fig. 1.
Figure 5:
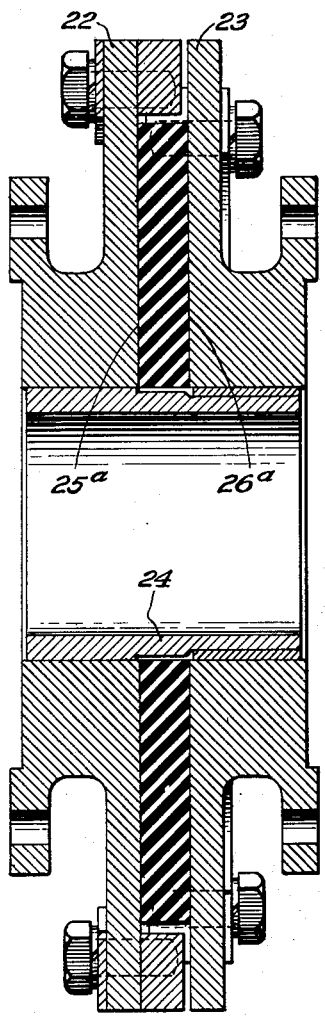
Figs. 5 and 6 are partial longitudinal sectional views of modified forms of resilient members that may be employed, if desired.
Figure 6:
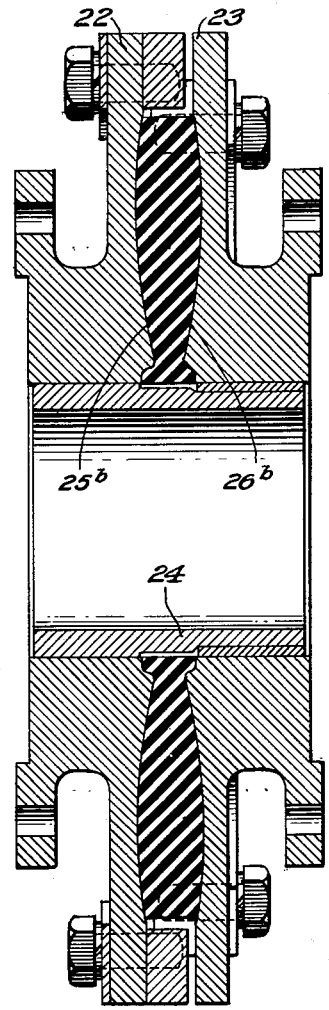

In the particular embodiment of the invention which is disclosed herein merely for the purpose of illustrating one specific form among possible others that the invention might take in practice, we show in Figs. 1 and 2 identical but reversely positioned hubs 10 and 11 pressed on and keyed respectively to the ends of a driving shaft 12 and of a substantially coaxial driven shaft 13, axially aligned but spaced apart from each other a suitable distance, each hub carrying a ring of external splines 14 which are preferably involute gear teeth generally barrel-shaped and preferably slightly curved longitudinally along their outer edges. Identical casings or sleeves 15 and 16, which surround hubs 10 and 11 are provided with similar but internal type of teeth 17 which mesh with splines 14 thereby to permit relative movements therebetween in angular, axial and parallel offset directions. The outer end of each sleeve has an end closure 18 while the inner end is provided with flange 20 for the attachment of the sleeves to two opposed radially extending similar, but reversely positioned, annular center plates 22 and 23. These plates are radially supported on a solid or tubular member 24 axially aligned with and located between the ends of shafts 12 and 13. The opposing faces of the plates may be of various shapes, one of which as shown in Fig. 2 has convexly conical sides 25 and 26 which, if extended towards each other would meet in a common vertex 27 located on the axes of the coupled shafts. Alternatively, these sides may also be parallel, as shown in Fig. 5 at 25a and 26a, or curved, as shown in Fig. 6 at 25b and 26b, or of other form. Filling the space between sides 25 and 26 of center plates 22 and 23 is a torsionally flexible annular element or disk 28 composed of a composition material which is vulcanized, bonded or otherwise secured firmly to said sides. This disk of resilient material is generally referred to herein as rubber which is intended to include any suitable resilient composition such as "neoprene," etc. Each center plate is provided with a flange 29 rigidly secured by bolts 30 to flange 20 of each sleeve member. The outer surface of approximately one-half of the length of tubular member 24 is reduced to accommodate a steady bearing 31 of either sleeve or anti-friction type. Relative oscillatory movement between the center plates is made possible by shrink-fitting center plate 22 to tubular member 24 and press-fitting steady bearing 31 on center plate 23.

An annular space 32 between each hub and its associated sleeve contains a quantity of lubricating oil or grease or suitable lubricant for the external and internal splines 14 and 17. Gasketed cover plates 33 are secured by bolts 34 over ends of the central apertures of the center plates, of tubular or solid member 24, and of steady bearing 31, so that such oil from spaces 32 cannot seep between tubular member 24 or steady bearing 31 and the center plates to come into contact with flexible annulus 28 to deteriorate its composition and weaken the degree of torsional resistance originally given it.

Figures 3, 4:
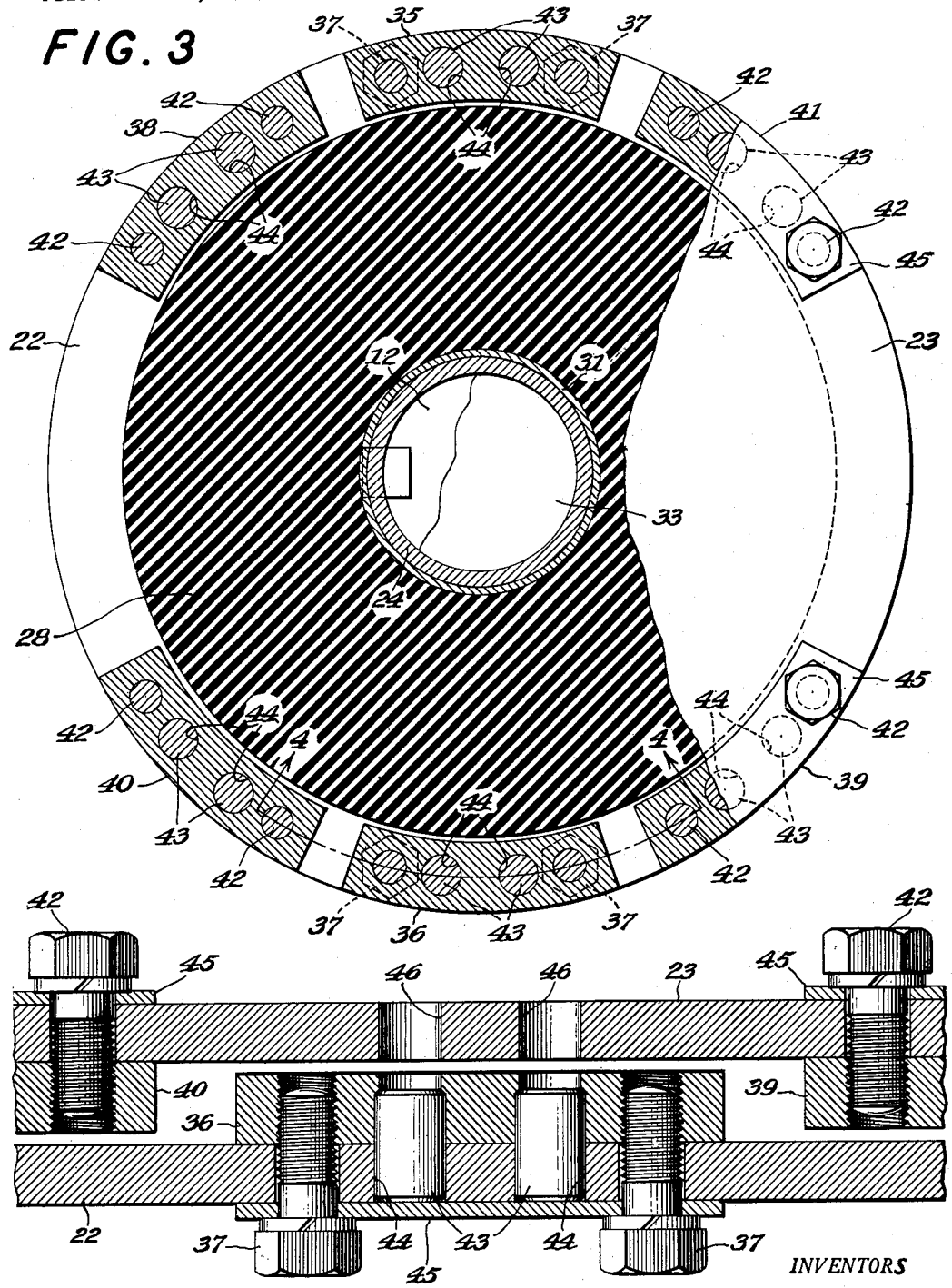
Fig. 3 is a transverse sectional view taken along the line 3—3 of Fig. 2 in the direction of the arrows.
Fig. 4 is an enlarged circumferential sectional view taken along the line 4—4 of Fig. 3 in the direction of the arrows.

Figs. 3 and 4 illustrate means for preventing relative rotation of center plates 22 and 23 beyond a predetermined number of degrees. Stop blocks 35 and 36 are secured to diametrically opposite sides of center plate 22 by bolts 37, while stop blocks 38 and 39, and 40 and 41 are secured to diametrically opposite sides of center plate 23 by bolts 42. Blocks 38, 39, 40 and 41 are spaced apart from blocks 35 and 36 a predetermined distance so that when the predetermined maximum degree of rotation of one center plate relative to the other center plate in either direction has been reached, stop blocks 35 and 36 come into contact either with blocks 38 and 39 or with blocks 40 and 41, depending upon the direction of rotation of the plates, thus preventing excessive torsional strain on flexible annulus 28 with possible rupture thereof. To prevent the torsional forces of the center plates from shearing off bolts 37 or 42, we employ two dowel pins 43 for each of the six blocks shown, inserting such pins from the outside of the center plates into shouldered holes 44 and retaining them therein by retaining plates 45 secured to the center plates by said bolts 37 and 42. Holes 46, drilled in the opposite center plate so as to register with shouldered holes 44 when the plates are torsionally unstressed, enable dowel pins 43 to be readily knocked out by a punch should they become frozen in the shouldered holes.

It is believed to be apparent that the degree of torsional flexibility of the flexible annulus 28 may be adjusted for a wide range of application merely by varying the thickness, angle, diameter or shape of the flexible annulus, as shown in Figs. 5 and 6, or the composition of the flexible member itself may be varied or by using any combination of such factors.

In operation, rotation of the driving shaft 12 is transmitted through keyed hub 10 and splines 14, 17 to sleeve 15 and center plate 22 and thence through the yieldable rubber annulus 28 to center plate 23, sleeve 16 and splines 14, 17 to hub 11 and any equipment attached to the driven shaft 13. Since annulus 28 is made of a torsionally flexible composition, such for example as rubber, vibrations caused by cyclic irregularity of driving shaft 12 or by some nodes of torsionally critical speeds, or by other forces, are not transmitted directly to driven shaft 13 but are absorbed to an appreciable extent by this resilient disk. This result is accomplished without failure of the disk because of the cooperative action of the splined transmission elements in allowing the coupling as a unit to receive every kind of operating force and condition but still operate the flexible disk so that it torsionally yields to a rated maximum and also transmits its maximum torque load. During this operation the shafts may be angularly misaligned and/or their axes, while remaining parallel, may be offset relative to each other, and also end float of the shafts may occur without producing appreciable end thrust on the flexible disk. Hence, the maximum strength of the flexible disk is available for the primary function of providing a high degree of load carrying capacity with maximum torsional resilience. Thus it is seen that we have provided a relatively simple and effective torsionally flexible shaft coupling that so controls various transmission forces within the coupling as a unit that the rubber disk can function most efficiently to its fullest capacity yet at the same time all of the adverse forces remain within the coupling unit without their adverse effects becoming detrimental.

Furthermore, in our improved coupling we now insure adequate lubrication of the splines without subjecting the resilient disk to the lubricant in case its composition should be made of rubber. We have also effectively supported by a bushing the two plates between which the resilient disk is attached so that these plates and the disk always remain as a unit that limits sagging while at the same time allowing the two plates to have relative angular movement during operation.

It will of course be understood that various changes in details of construction and arrangement of parts may be made by those skilled in the art without departing from the spirit of the invention as set forth in the appended claims.

We claim:

1. A coupling for connecting a pair of substantially coaxial shafts comprising, in combination, a pair of opposed radially extending members, a disk of resilient material disposed between and bonded to said members to transmit rotary movement between the same while being torsionally yieldable, means for rotatively transmitting power between one of the shafts and the resilient disk including a pair of cooperating parts which are relatively non-rotatably but axially freely slidably connected together and adapted to have their axes angularly misaligned without transmitting misaligning forces to the disk, one of said parts being connected to one of said opposed members and the other part being adapted for connection to said shaft, similar means for rotatably transmitting power between the other of the shafts and the resilient disk including a pair of cooperating parts which are relatively non-rotatably but axially free slidably connected together with their axes adapted to be angularly misaligned without transmitting misalignment forces to the disk, one of the parts of said last-mentioned cooperating parts being connected to the other of said opposed members and the other part of such last-mentioned cooperating parts being adapted for connection to said other shaft, whereby the resilient disk is free of stresses arising from misalignment between the shafts thereby allowing the resilient material to have maximum strength available for its load transmitting and torsionally yielding functions, and means extending axially from one of the opposed radially extending members to the other for engagement therewith to center the members relative to each other while still allowing the same to have relative oscillatory movement during torsional yielding of the resilient member.

2. A coupling for connecting a pair of substantially coaxial shafts comprising, in combination, a pair of opposed radially extending members, a disk of resilient material disposed between and bonded to said members to transmit rotary movement between the same while being torsionally yieldable, means for rotatively transmitting power between one of the shafts and the resilient disk including a pair of cooperating parts which are relatively non-rotatably but axially freely slidably connected together and adapted to have their axes angularly misaligned without transmitting misaligning forces to the disk, one of said parts being connected to one of said opposed members and the other part being adapted for connection to said shaft, similar means for rotatably transmitting power between the other of the shafts and the resilient disk including a pair of cooperating parts which are relatively non-rotatably but axially freely slidably connected together with their axes adapted to be angularly misaligned without transmitting misalignment forces to the disk, one of the parts of said last-mentioned cooperating parts being connected to the other of said opposed members and the other part of such last-mentioned cooperating parts being adapted for connection to said other shaft, whereby the resilient disk is free of stresses arising from misalignment between the shafts thereby allowing the resilient material to have maximum strength available for its load transmitting and torsionally yielding functions, and means extending axially from one of the opposed radially extending members to the other for engagement therewith to center the members relative to each other while still allowing the same to have relative oscillatory movement during torsional yielding of the resilient member, and means for preventing axial access of foreign material to said centering means.

3. A coupling for connecting a pair of substantially coaxial shafts comprising, in combination, a pair of opposed radially extending members, a disk of resilient material disposed between and bonded to said members to transmit rotary movement between the same while being torsionally yieldable, means for rotatively transmitting power between one of the shafts and the resilient disk including a pair of cooperating parts which are relatively non-rotatably but axially freely slidably connected together and adapted to have their axes angularly misaligned without transmitting misaligning forces to the disk, one of said parts being connected to one of said opposed members and the other part being adapted for connection to said shaft, similar means for rotatably transmitting power between the other of the shafts and the resilient disk including a pair of cooperating parts which are relatively non-rotatably but axially freely slidably connected together with their axes adapted to be angularly misaligned without transmitting misalignment forces to the disk, one of the parts of said last-mentioned cooperating parts being connected to the other of said opposed members and the other part of such last-mentioned cooperating parts being adapted for connection to said other shaft, whereby the resilient disk is free of stresses arising from misalignment between the shafts thereby allowing the resilient material to have maximum strength available for its load transmitting and torsionally yielding functions, said resilient disk having a central axial opening, means extending from one of the opposed radially extending members axially through said opening to the other member for engagement therewith to center the members relative to each other while still allowing the same to have relative oscillatory movement during torsional yielding of the resilient member, and radial plates respectively secured to the opposed members in axially spaced relation and the centering means being disposed between the plates whereby access of foreign material to said centering means is prevented and lubricant may be used on said cooperating parts which permit said misalignment without having the resilient material exposed to such lubricant through the central axial opening in the disk.

References Cited in the file of this patent

UNITED STATES PATENTS

| | | |
|---|---|---|
| 2,444,904 | Worley | July 6, 1948 |
| 2,582,873 | Larson et al. | Jan. 15, 1952 |
| 2,592,309 | Meier | Apr. 8, 1952 |
| 2,593,877 | Hagenlocher | Apr. 22, 1952 |

FOREIGN PATENTS

| | | |
|---|---|---|
| 621,419 | Great Britain | 1949 |